United States Patent
Fergusson

(10) Patent No.: US 8,606,669 B2
(45) Date of Patent: Dec. 10, 2013

(54) SYSTEMS AND METHODS FOR CLIENT SCREENING IN THE FINANCIAL SERVICES INDUSTRY

(75) Inventor: Scott Fergusson, Fort Wayne, IN (US)

(73) Assignee: Broadridge Securities Processing Solutions, Inc., Jersey City, NJ (US)

( * ) Notice: Subject to any disclaimer, the term of this patent is extended or adjusted under 35 U.S.C. 154(b) by 1146 days.

(21) Appl. No.: 11/421,686

(22) Filed: Jun. 1, 2006

(65) Prior Publication Data

US 2008/0040610 A1    Feb. 14, 2008

(51) Int. Cl.
    *G06Q 40/00*      (2012.01)
    *H04L 29/06*      (2006.01)

(52) U.S. Cl.
    CPC ............ *G06Q 40/00* (2013.01); *H04L 63/0884* (2013.01); *Y10S 902/05* (2013.01)
    USPC .......... 705/35; 705/67; 705/44; 726/4; 726/5; 902/5

(58) Field of Classification Search
    CPC .................................................. H04L 63/0884
    USPC ....................... 705/35, 67, 44; 726/4, 5; 902/5
    See application file for complete search history.

(56) References Cited

U.S. PATENT DOCUMENTS

| | | | |
|---|---|---|---|
| 5,930,764 A * | 7/1999 | Melchione et al. | 705/10 |
| 6,965,865 B2 * | 11/2005 | Pletz et al. | 705/346 |
| 7,349,557 B2 * | 3/2008 | Tibor | 382/115 |
| 7,686,214 B1 * | 3/2010 | Shao et al. | 235/380 |
| 2002/0026404 A1 | 2/2002 | Thompson | |
| 2002/0032640 A1 | 3/2002 | LaFore et al. | |
| 2003/0023531 A1 | 1/2003 | Fergusson | |
| 2003/0225692 A1 * | 12/2003 | Bosch et al. | 705/42 |
| 2004/0153663 A1 * | 8/2004 | Clark et al. | 713/200 |
| 2005/0144143 A1 * | 6/2005 | Freiberg | 705/75 |
| 2005/0222931 A1 * | 10/2005 | Mamou et al. | 705/35 |
| 2006/0248045 A1 * | 11/2006 | Toledano et al. | 707/2 |
| 2006/0271457 A1 * | 11/2006 | Romain et al. | 705/35 |

OTHER PUBLICATIONS

Department of the Treasury, Office of Public Affairs, Fact Sheet: Final Regulations Implementing Customer Identity Verification Requirements under Section 326 of the USA Patriot Act, 2 pages, Apr. 30, 2003.
https://www.remitpro.com//Remitpro_USA_Compliance_Solution.htm, RemitPro Compliance Solutions, 4 pages, printed Mar. 27, 2006.
http://www.smrh.com/publications/pubview.cfm, Keeping Step with the US Patriot Act, 4 pages, printed Dec. 15, 2005.

(Continued)

*Primary Examiner* — Kirsten Apple
*Assistant Examiner* — Scott S Trotter
(74) *Attorney, Agent, or Firm* — Greenberg Traurig, LLP

(57) ABSTRACT

Systems, methods, and interfaces for screening clients for security compliance with a Customer Identification Program are disclosed. An illustrative system for screening clients can include a client screening engine adapted to filter client account data based on one or more filtering criteria, a database adapted to store client account information and verification status information, and a graphical user interface adapted to selectively display client account information and verification status information for one or more selected clients on a screen. The system can be used to submit identity verification requests to Customer Identification Program vendors for only those clients whose identity have not been verified.

12 Claims, 17 Drawing Sheets

(56) References Cited

OTHER PUBLICATIONS

Bukics et al., "How CPAs Can Help Spot when Client Investments are being mishandeled," Journal of Accountancy, pp. 63-67, Oct. 1996.

Dialog (Penny Stock Disclosure Rules), Security and Exchange Commision, Dialog File 180, Accession No. 02251552, pp. 1-112, Apr. 1992.

* cited by examiner

| | | | | | | |
|---|---|---|---|---|---|---|
| 213579 | Amanda | Chuluota, FL 32766 4265 | | | | |
| 213579 | Aljay, Sheryl | 919 Rutherford St. Bellingham, WA 98225 | 377-67-2747 | Residential | Not verified | 6/1/2004 | 315436.29 Submit |
| 213579 | Aljay, Sheryl | 919 Rutherford St. Bellingham, WA 98225 | 377-67-2747 | Residential | Not verified | 10/26/2004 | 229751.88 Submit |
| 305096 | Jones, Shiela | 912 Spring Ave. Fargo, ND 58102 | 802-12-6336 | Residential | Not verified | 1/1/1900 | 315112.37 Submit |
| 305094 | Jones, Indiana | 912 Spring Ave. Fargo, ND 58102 | 488-06-7315 | Residential | Not verified | 1/1/1900 | 315112.37 Submit |
| 546978 | Purdy, Cindy | 219 Ferrel Ave. Topeka, KS 66601 | 631-54-9457 | Residential | Passed | 11/30/2004 1/24/2005 | 247551.99 Submit |
| 916473 | Siemers, Jimmy | 743 Stageline Rd. Chandler, AZ 85224 | 811-32-8132 | Residential | Not verified | 1/1/1900 | 229751.88 Submit |
| 546812 | Pitts, Mike | 105 112th Ave. Rapid City, SD 57701 | 867-53-0901 | Residential | Passed | 11/30/2004 1/1/1900 | 298154.41 Submit |
| 894651 | Doe, John | 615 Spooner Dr. Billings, MT 59101 | 501-97-4237 | Residential | Not verified | 1/1/1900 | 298154.41 Submit |

148 — 164 — 166 — 216
218 Reset Selections — Reset each account back to last known settings
220 Reset Sort Order — Reset to original sort Order (SSN, Account Number)
222 Update Accounts — Updating accounts will set each account shown above to the action indicated to the right of each account

SYSTEMS AND METHODS FOR CLIENT SCREENING IN THE FINANCIAL SERVICES INDUSTRY

FIELD

The present invention relates generally to the field of client screening. More specifically, the present invention pertains to systems, methods, and interfaces for client identity screening in the financial services industry.

BACKGROUND

Compliance with newly enacted security rules and regulations in the financial services industry has placed additional burdens on broker-dealers to conduct client identity screening for both new and existing clients. With the recent promulgation of the USA Patriot Act, for example, broker-dealers are now required to develop a Customer Identification Program (CIP) that implements reasonable procedures (1) to collect identifying information about their customers upon opening an account; (2) to verify their customer's identity; (3) to maintain records of the information used to verify the customer's identity; and (4) to determine whether the customer appears on any list of suspected terrorists or terrorist organizations. Financial institutions that are required to comply with such rules include, for example, securities brokers and dealers, banks and trust companies, currency exchanges, insurance companies, savings associations, credit unions, mutual fund companies, futures commission merchants, futures introducing brokers, as well as other organizations operating in the financial services industry. In some cases, organizations outside of the financial services industry may also be obligated to comply with these rules and regulations.

As a part of their Customer Identification Program obligations to collect and verify customer information, many financial institutions are required to develop procedures to collect relevant identifying information regarding each customer's name, address, date of birth, and taxpayer identification number such as Social Security Number or government-issued passport number. Verification of the customer's identifying information typically occurs with traditional documentation such as a driver's license or passport, although other alternative methods may be implemented provided the documentation meets certain threshold requirements.

In addition to collecting and verifying customer information, financial institutions must also implement procedures to check their customers against lists of suspected terrorists or terrorist organizations maintained by the government. To fulfill this obligation, some financial institutions elect to partner with a third-party vendor that specializes in performing client identity verification. An example of such CIP vendor can include RemitPro, LLC of Omaha, Nebr., which provides a client validation software module under the trade name RISKALERT. Access to the CIP vendor's verification program is typically accomplished by a direct connection or via an Internet portal, and generally involves the transmission of client identifying information to the vendor for cross-checking the customer against multiple databases. Once checked against these databases, a message indicating whether the verification passed, failed, or requires further review is then provided back to the requesting party. In some cases, additional information about the customer may be sent back to the requesting party in the event the verification request was unsuccessful, or if the customer's name appears on a watch list of suspicious individuals or organizations.

More automated systems for client identity screening are becoming increasingly necessary in the financial services industry as a result of the additional requirements placed on compliance managers and other corporate officials responsible for compliance with Customer Identification Programs. With respect to some broker-dealers, for example, compliance with the Customer Identification Program is typically accomplished by the same compliance manger or officer responsible for overseeing compliance with other securities provisions such as trade confirmations, suitability provisions, etc., placing additional burdens on these individuals to ensure full compliance.

Although many financial institutions are able to offload some of their identification and verification obligations to CIP vendors, the costs associated with such offloading can be significant. Existing software programs used by financial institutions to ensure CIP compliance is often conducted on a per account basis, and do not provide a mechanism for filtering existing clients that have already been screened for compliance and/or who have certain accounts that may be exempted from compliance. In some cases, the software program employed may not provide the ability to specify more detailed information about the customer, or may not associate together multiple accounts held by a single customer. Because many CIP vendors charge on a per item basis each time a verification request is performed, the practice of duplicating client identifying information used by many institutions often results in an increase in the total cost of compliance. In addition, the practice of submitting duplicative entries for verification often increases the storage space required to maintain records of the information used to verify the customer's identity, further adding to the total cost of compliance Accordingly, there is a need for automated solutions for performing client identity screening in the financial services industry in order to more efficiently meet security rules and regulations.

SUMMARY

The present invention pertains to systems, methods, and interfaces for client identity screening in the financial services industry. An illustrative system for screening clients for security compliance can include a database adapted to store client account information and verification status information, a client screening engine adapted to filter client account data based on one or more filtering criteria, and a graphical user interface adapted to selectively display client account information and verification status information for one or more clients on a screen. The client screening engine can be configured to automatically update the database each time a new account is opened for a new or existing client, when a name or address change of a client is received, and/or when a request is received from a representative or supervisor. The engine can be further configured to associate account data from multiple accounts together via a unique client identification number.

An illustrative method of screening clients for security compliance can include the steps of initiating a client screening request and receiving client account data for one or more new or existing clients from an account custodian, and associating such account data with a unique client identification tag for each client. Once associated, the client account data can then be filtered based on one or more filter criteria to provide a filtered subset of the client account data. In some embodiments, for example, such filtering can include identifying whether the client has been previously verified, or determining whether the account prompting the verification request is exempted from compliance. Once filtered, a dataset containing only unverified clients can be outputted to a Customer Identification Program (CIP) vendor for identity verification. A report indicating the verification status of each client can then be provided back to the user indicating the verification status of each client.

In some embodiments, a graphical user interface may be employed to permit a user to filter various client account data for display on a display screen. The graphical user interface can include a submission screen for use in submitting client account data to the CIP vendor, and a verification screen for notifying the user of the verification status of one or more clients submitted for verification. The graphical user interface can include various fields to facilitate client identity screening, including a client verification field, a filtering field, an account type field, and an action-to-take field. In some embodiments, a separate reporting screen may be used to display client verification information along with other account information pertaining to a particular client or clients.

BRIEF DESCRIPTION OF THE DRAWINGS

FIG. 8 is a screen shot of an illustrative submission screen for selecting clients to be verified;

FIG. 9 is a screen shot showing the selection of an account type field on the submission screen of FIG. 8;

Figure 10:
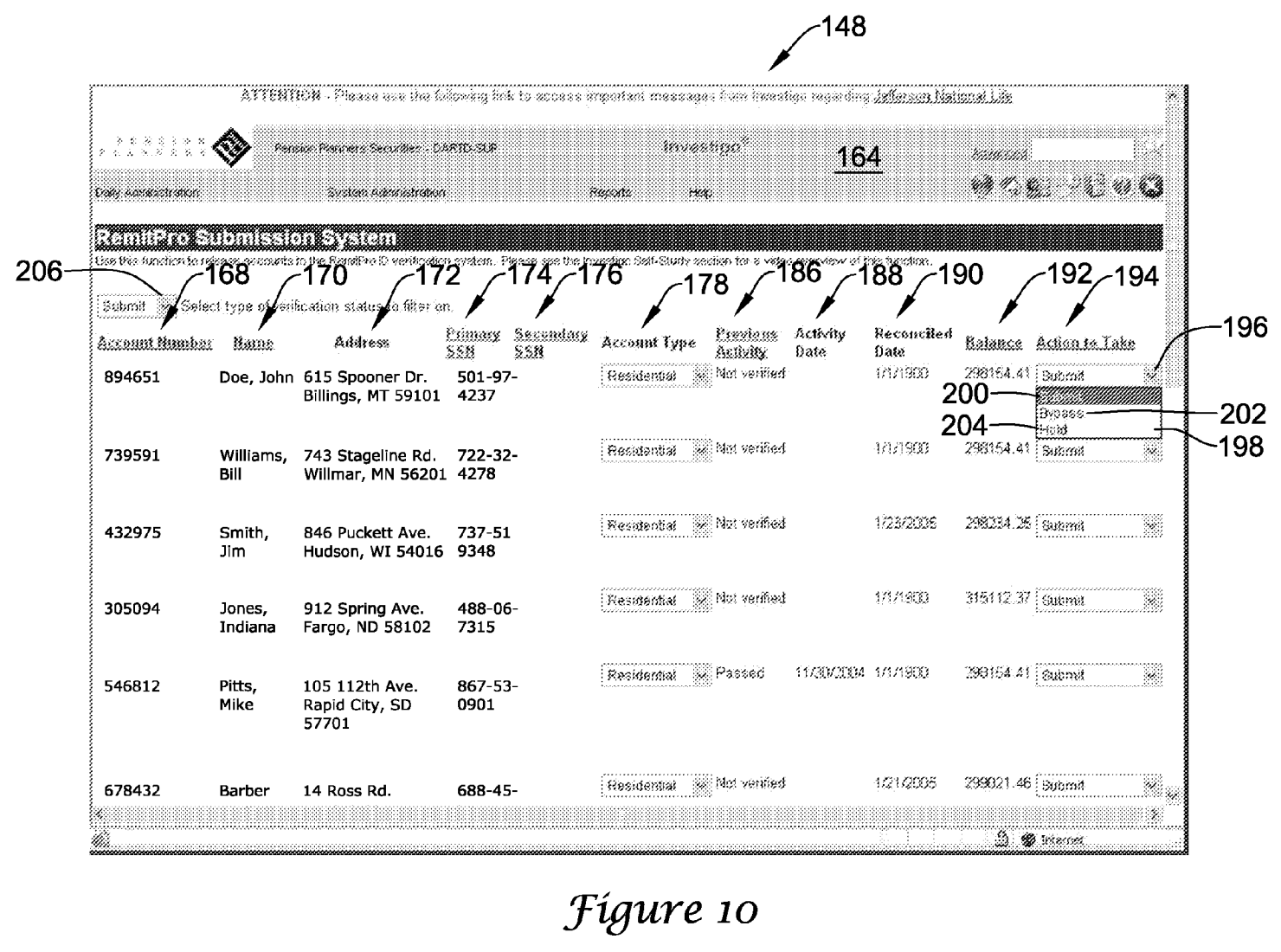

FIG. 10 is a screen shot showing the selection of an action-to-take field on the submission screen of FIG. 8;

FIG. 12 is a screen shot showing a lower section of the submission screen of FIG. 8;

FIG. 13 is a screen shot showing the selection of a report screen for displaying customer identification exception information;

FIG. 14 is a screen shot showing an illustrative report screen for generating an account summary report;

FIG. 15 is a screen shot showing an illustrative account summary screen for displaying verification status information for a selected client;

DETAILED DESCRIPTION

The following description should be read with reference to the drawings, in which like elements in different drawings are numbered in like fashion. The drawings depict selected embodiments, and are not intended to limit the scope of the invention. Although examples of various systems, methods, and interfaces are illustrated in the various views, those skilled in the art will recognize that many of the examples provided have suitable alternatives that can be utilized. In addition, while the illustrative systems, methods, and interfaces are described with respect to broker-dealers, it should be understood that many of the elements and steps described herein can be applied to client identity screening for other financial service organizations or other organizations where client identity screening is desired.

Figure 1:
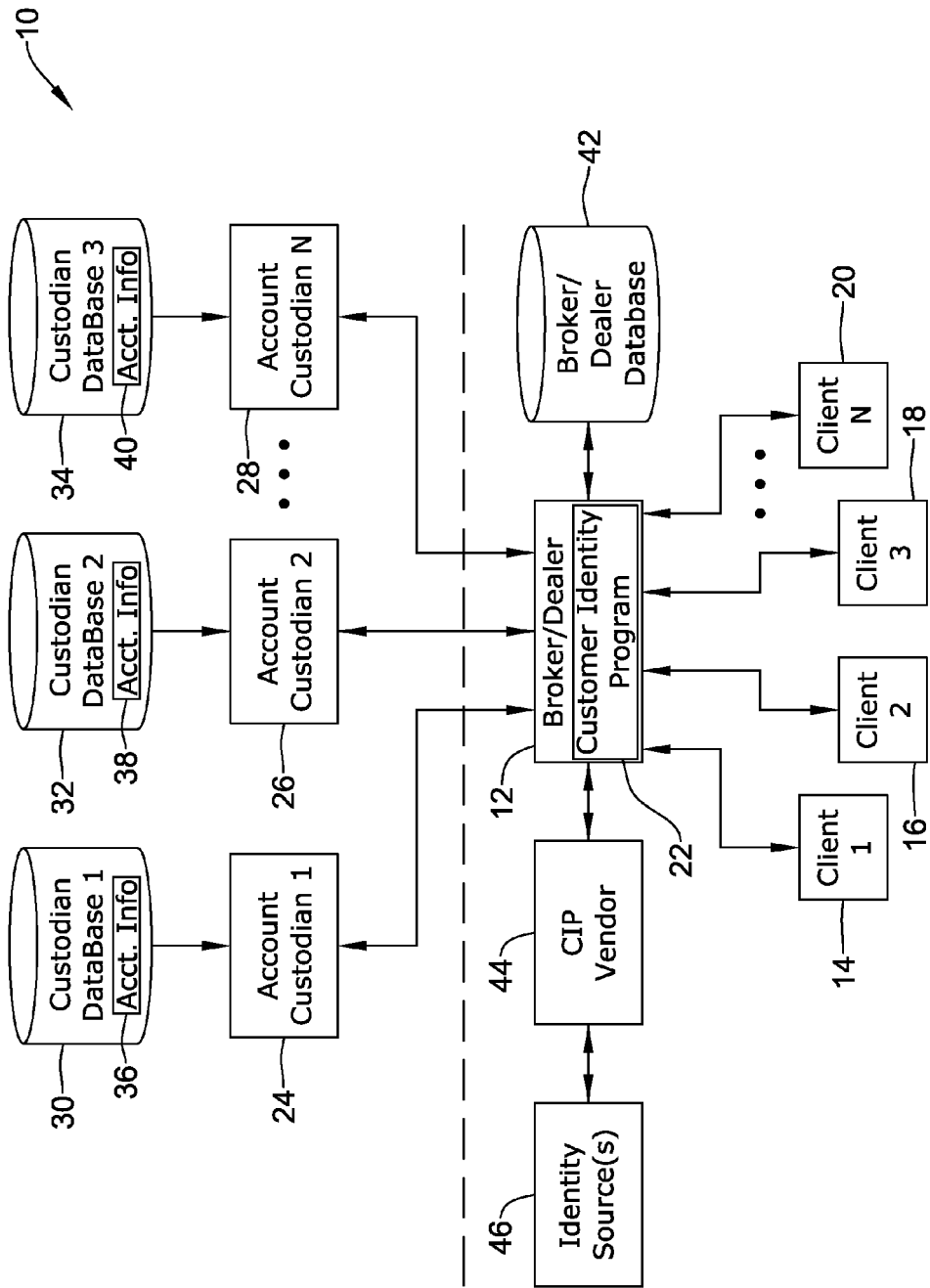
FIG. 1 is a schematic view of an illustrative client identity verification system for screening clients of a broker-dealer for security compliance.

Referring now to FIG. 1, a schematic view of an illustrative client identity verification system 10 for screening clients of a broker-dealer 12 for security compliance will now be described. As shown in FIG. 1, the system 10 can include a number of clients 14,16,18,20 each of which whose identity must be verified as a part of an in-house Customer Identification Program (CIP) 22 implemented by the broker-dealer 12. The CIP 22 implemented by broker-dealer 12, for example, may be provided as part of a compliance program for screening new and existing clients for compliance with the provisions of the USA Patriot Act. It should be understood, however, that the CIP 22 can be implemented in response to other rules or regulations, or as a general security measure to screen clients for possible fraudulent activity or account errors. In other industries such as the mortgage lending industry, for example, the CIP 22 may be implemented to perform client identification and verification for the loan approval process. As a further example in the context of business hiring, the CIP 22 may be implemented as part of a hiring program for screening potential employees.

As a part of its services, the broker-dealer 12 can act as an intermediary for the purchase of private and/or public securities from a number of account custodians 24,26,28. For example, the account custodians 24,26,28 may comprise mutual fund companies, annuities companies, insurance companies, or other such organizations or businesses licensed to sell particular types of securities, either directly to the clients 14,16,18,20 or through an intermediary such as the broker-dealer 12. A first and second account custodian 24,26 of the broker-dealer 12, for example, can include mutual fund firms such Vanguard Group, Inc. or American Funds Service Company whereas a third account custodian 28 of the broker-dealer 12 can include an insurance provider such as the Jefferson National Life Insurance Company. In some cases, one or more of the account custodians 24,26,28 can comprise a separate broker-dealer licensed to conduct business on behalf of the broker-dealer 12. In some cases, the broker-dealer 12 itself may be an account custodian that provides its own private-label brand of securities to its clients 14,16,18,20. An example of a situation where the broker-dealer 12 is also an account custodian may be Merrill Lynch & Co., Inc., which sells its own private-label brand of securities.

The clients 14,16,18,20 to the broker-dealer 12 can include personal investors and/or institutional investors who wish to purchase securities or securities-related products from one or more of the account custodians 24,26,28. The clients 14,16, 18,20 can be existing customers having an existing business relationship with the broker-dealer 12, or can be new customers seeking to open an account with the broker-dealer 12.

Each of the account custodians 24,26,28 can have a respective database 30,32,34 for storing account information 36,38, 40 for each client. Account information 36,38,40 maintained by the account custodian will typically vary depending on the type of services provided. In some cases, state and federal securities laws will dictate the type of account information 36,38,40 to be maintained by the account custodian 24,26,28. By way of example and not limitation, account information 36,38,40 stored within the databases 30,32,34 can include customer name, address, contact information, birth-date, social-security number, net-worth, investment objectives, account type(s), number of shares, trade dates, confirmation dates, activity dates, stock powers, etc.

The broker-dealer 12 can further include a broker-dealer (B/D) database 42 for storing account related information received from the clients 14,16,18,20 and account custodians 24,26,28. As a part of its CIP 22, the broker-dealer database 42 may store various client identifying information, including customer name, address, contact information, birth-date, and social-security number. Information used to verify the client's identity such as drivers license number or passport number may also be stored within the broker-dealer database 42 along with the dates and times on which such records were relied upon. Other account-related information such as account type(s), number of shares, trade dates, confirmation dates, activity dates, stock powers, etc. may also be stored within the broker-dealer database 42.

The broker-dealer 12 can be further partnered with a third-party Customer Identification Program (CIP) vendor 44 that specializes in performing client identity verification. The CIP vendor 44, in turn, can be configured to scan one or more sources 46 to confirm the identity of the client. Examples of sources 46 used to cross-check a client's identity may include property tax records, legal records, public lien recordings, bankruptcy records, federal and state income tax records, driver's license records, credit-bureau records, etc. The CIP vendor 44 may also cross-check the client's identity against a list of terrorists or terrorist organizations maintained by various branches of the government. Typically, the CIP vendor 44 will provide identity verification based on the client's social security number (SSN) or other unique client identifier.

Figure 2:
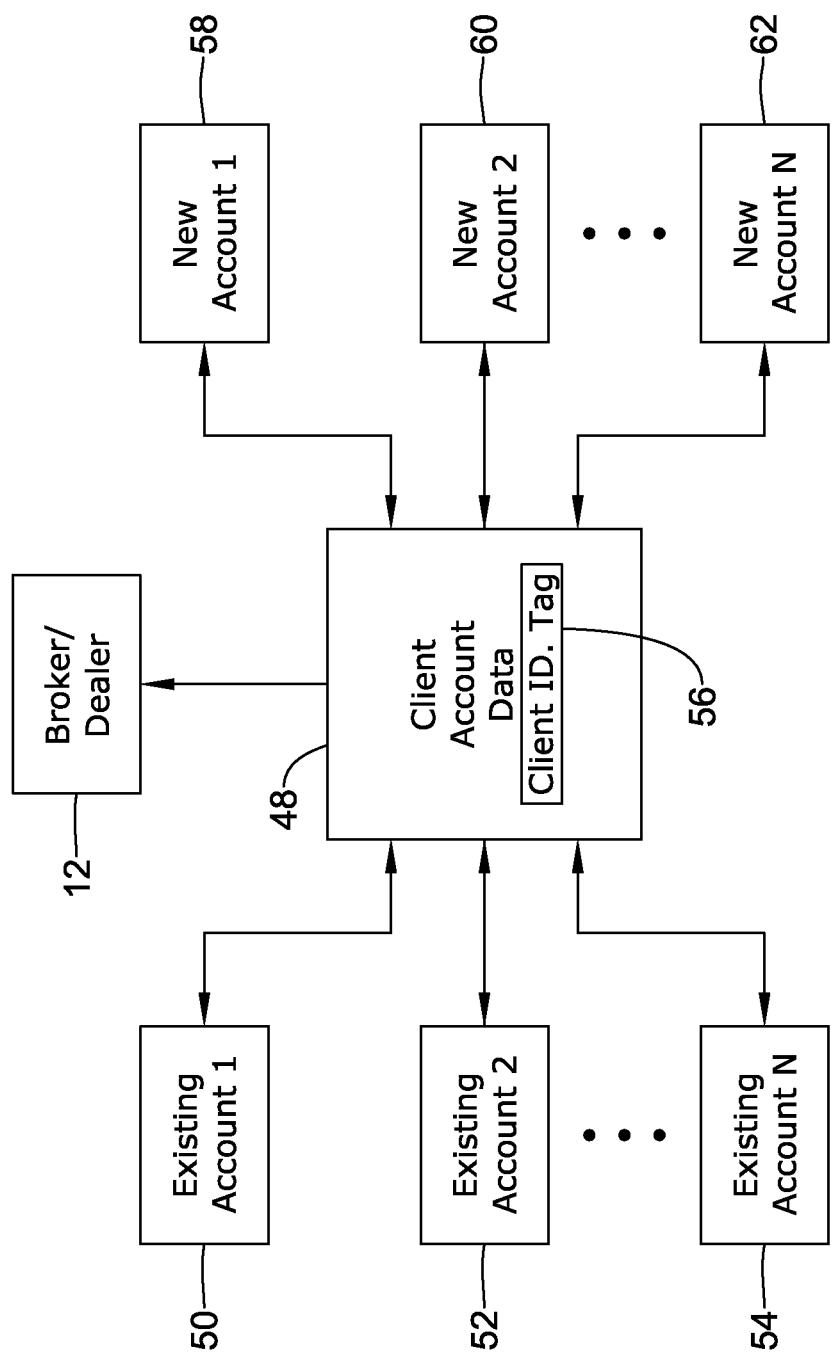
FIG. 2 is a schematic view showing a sample client account managed by the broker-dealer of FIG. 1.

FIG. 2 is a schematic view showing a sample client account managed by the broker-dealer 12 of FIG. 1. As can be seen in FIG. 2, the broker-dealer 12 can be configured to maintain client account data 48 for each client, which can include data from one or more existing accounts 50,52,54, as shown. Accounts 50,52,54 may represent, for example, multiple existing accounts held by an individual or institutional investor. Typically, the client account data 48 will be linked together via a client identification tag 56 such as a social security number (SSN), passport number, or other unique client identifier.

In a conventional CIP verification system, the addition of one or more new accounts 58,60,62 will typically prompt the broker-dealer 12 to send out a request to the CIP vendor to verify the client's identity. Such identity verification request is usually made without regard to whether a previous verification request for that client was made, or whether the type of account being established requires such verification. If, for example, each of the new accounts 58,60,62 to be opened are accounts that fall under the provisions of the Employee Retirement Income Security Act (ERISA), existing verification systems would prompt the broker-dealer 12 to request client verification from the CIP vendor even though such accounts are specifically exempted from compliance from the provisions of the USA Patriot Act. In the illustrative case depicted in FIG. 2, for example, the opening of three accounts 58,60,62 exempted under ERISA would result in three separate requests being sent to the CIP vendor for verification, duplicating the verification process and increasing the total cost of client screening. In some cases, a change in a client's address may prompt the broker-dealer 12 to instigate an identity verification request even when such request may have already been performed, further increasing the costs associated with client screening.

Figure 3:
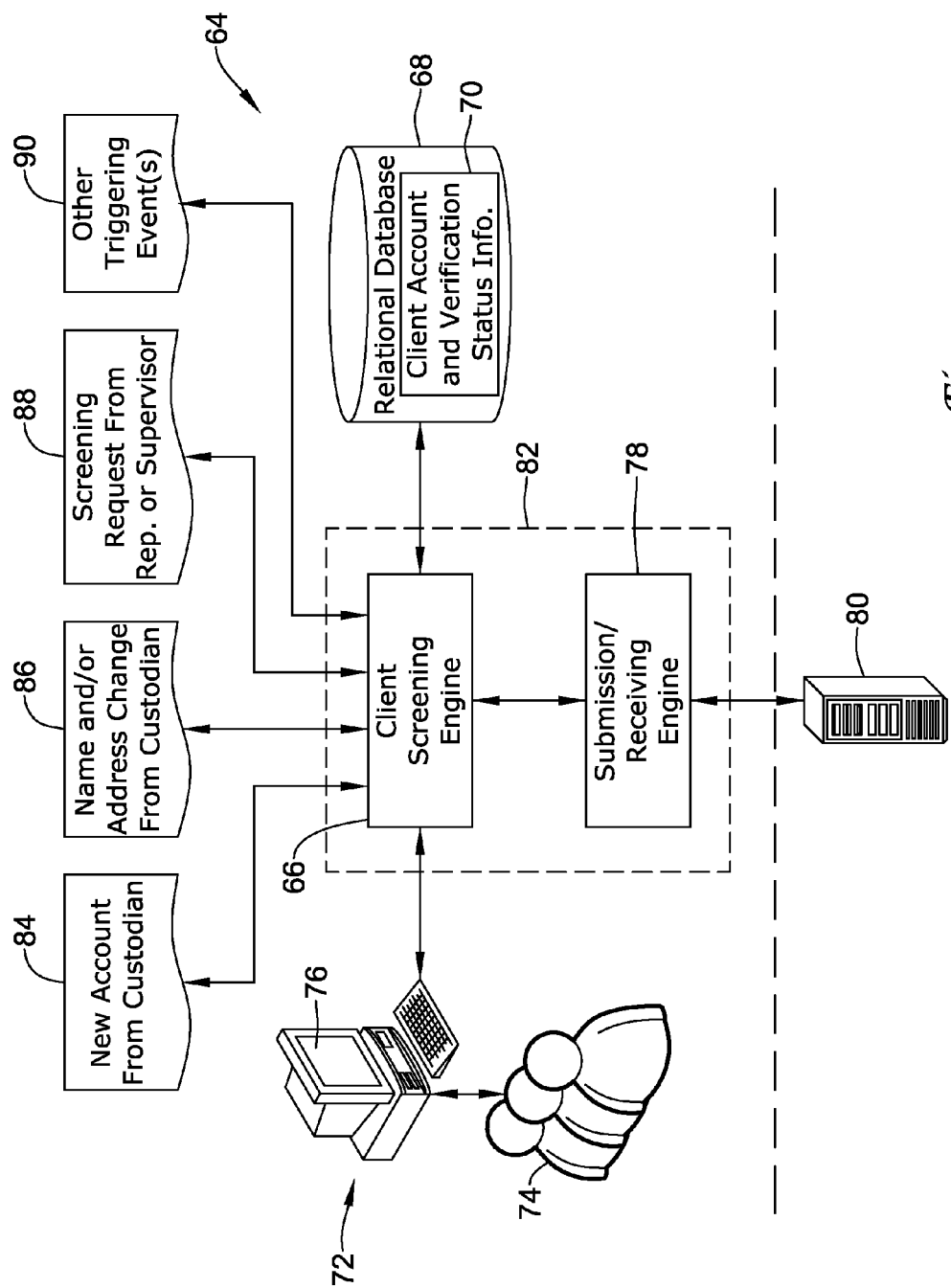
FIG. 3 is a schematic view of an illustrative system for screening clients for security compliance.

FIG. 3 is a schematic view of an illustrative system 64 for screening clients for security compliance. As shown in FIG. 3, the system 64 can generally include a client screening submission engine 66, a database 68 adapted to store client account information and verification status information 70, and an interface such as a graphical user interface (GUI) 72 adapted to display client account and verification status information for one or more users 74 on a display screen 76. The client screening engine 66 can be implemented as software and/or hardware configured to run on a personal computer, LAN network server, a WLAN network server, a WAN network server, or other suitable computer platform. In some embodiments, the client screening engine 66 can comprise an Internet or intranet-based application accessible to the users 74 via the World Wide Web (WWW). The graphical user interface 72 used to provide access to the client screening engine 66 can be configured to operate on a personal computer, laptop computer, Palm® pilot, Blackberry®, pager, or other suitable device capable of displaying information to users on a display screen.

The client screening engine 66 can be linked to a submission/receiving engine 78, which provides software and/or hardware functionality for communicating with one or more third-party CIP vendors 80 capable of performing client identity verification. The submission/receiving engine 78 can include, for example, a software module operating on an Application Service Provider (ASP) using a platform such as Linux®, Oracle 9i®, and/or Java® to facilitate communications and interfacing between the client screening engine 66 and each CIP vendor 80. The submission/receiving engine 78 can be integrated with client screening engine 66, as indicated generally by the dashed box 82, or can comprise a separate module linked to the client screening engine 66.

Initiation of client screening engine 66 can occur automatically in response to a triggering event such as the opening of a new client account from an account custodian 84, a name or address change received from the account custodian 86, and/or a client screening request received from a representative or supervisor 88 desiring to verify the identity of one or more new or existing clients. As indicated generally by box 90, the client screening engine 66 can also be initiated in response to other triggering events. Examples of other triggering events 90 may include, but are not limited to, a change in marital status by a client, a change in citizenship of a client, an inconsistency in client identifying data between one or more accounts held by an account custodian, etc.

The client screening engine 66 can be configured to filter account data provided to the user's 74 display screen 76 allowing the user 74 to select only certain clients to be submitted for screening based on one or more filtering criteria. The graphical user interface 72 may permit the user 74 to display a list of only those clients that fall within a particular category, allowing the user 74 to better manage their customers. In some embodiments, for example, the graphical user interface 72 can be configured to selectively display a list of only those clients that have not been previously submitted for client identity verification with the CIP vendor 80. Alternatively, and in other embodiments, the graphical user interface 72 can be configured to selectively display only those clients whose identity has been previously verified. Other filtering criteria for managing the client screening process can be further understood with respect to FIGS. 7-16, which show several screen shots of an illustrative graphical user interface 148 that can be employed by the user 74 to interact with the client screening engine 66.

Figure 4:
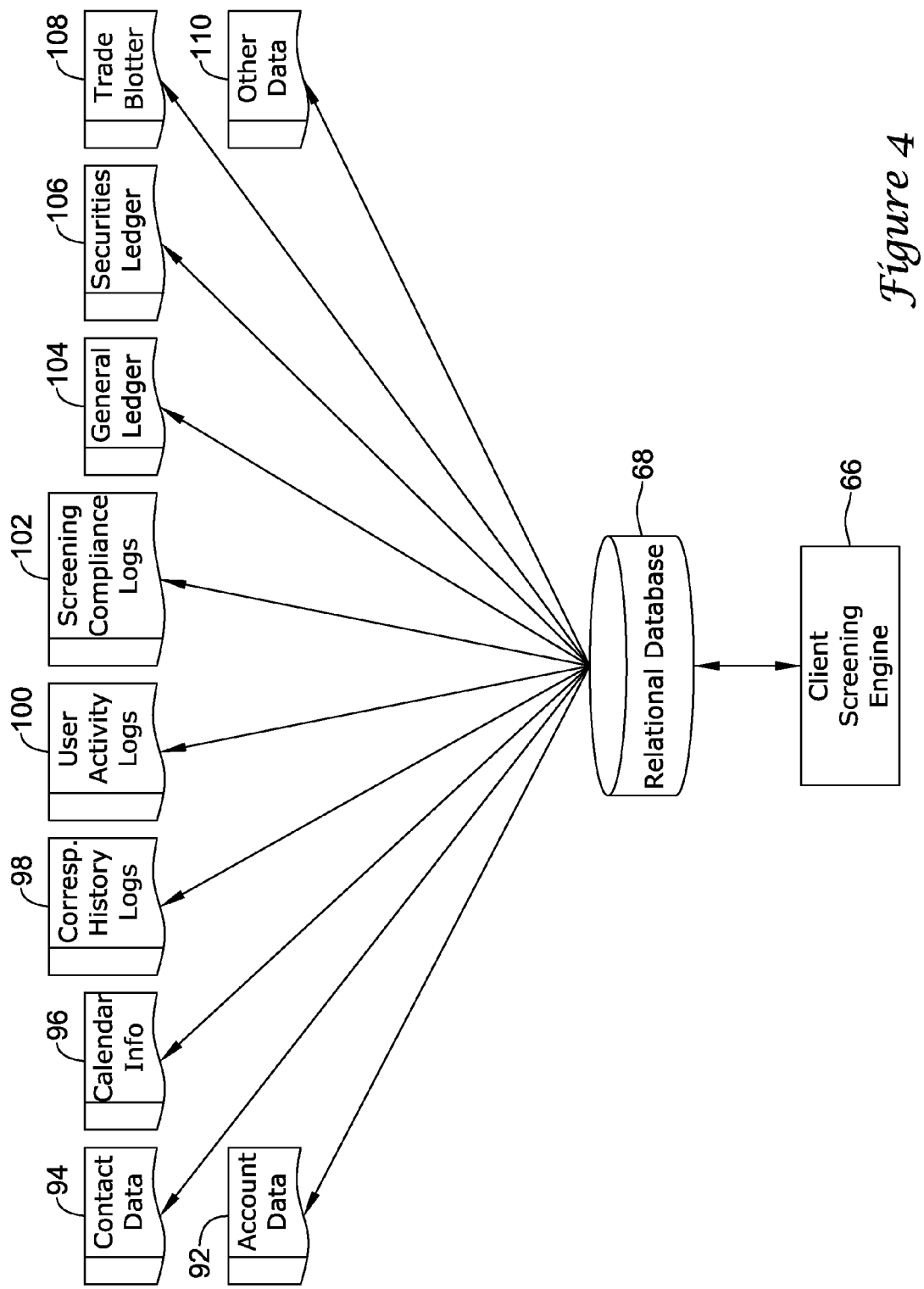
FIG. 4 is a schematic view showing an illustrative list of client account data stored within the broker-dealer database of FIG. 3.

FIG. 4 is a schematic view showing an illustrative list of client account data 70 that can be stored within the broker-dealer database 68 of FIG. 3. As shown in FIG. 4, client account data 70 stored within the database 68 can include a client account data 92, client contact information 94, calendar information 96, correspondence history logs 98, user activity logs 100, screening compliance logs 102, general ledger data 104, securities-related ledger data 106, trade blotter data 108, as well as other data 110. In some embodiments, the database 68 used to store such account data 70 may comprise a relational database operating on a suitable platform such as Microsoft Access®, Microsoft SQL Server 2000®, or Oracle 9i®. Although a single database 68 is shown in FIG. 4, it should be understood that multiple local and/or remote databases can be employed to store the client account data 70.

The account data file 92 can contain information about each customer's account including customer account numbers, current and past account holdings, investment objectives for the account, etc. The contact information file 94, in turn, can contain personal information for each client including the customer's full name, nick-name, address, address type (e.g. prime residence, secondary residence, business address, etc.), phone number, fax number, E-mail address, etc. In some cases, the contact information file 94 may contain more specific information about the customer including interests and important dates (e.g. anniversary dates, graduations dates, etc.). The calendar information file 96 contains a list of appointments as well as other items provided by the users 74. A client screening log file 102 can be recorded within the database 68 for maintaining records of the information used to verify each customer's identity. Information that can be stored within the client screening log file 102 can include, for example, the driver's license number, passport number, or other document used to confirm the identity of the client as well as the dates and/or times upon which such documents were relied upon. Data relating to whether the each client has been screened for identity verification can also be stored within the client screening log file 102.

The correspondence history data file 98 can be provided to store the correspondence history between each user and their customers. The user activity data file 100 can store information related to each user's activity on the system. General ledger data file 104 can store a general ledger for the broker-dealer firm. The securities ledger data file 106, in turn, can contain records for each buy and sell executed by the broker dealer firm. The trade blotter data file 108 can be used to store each trade executed by the broker-dealer.

Figure 5:
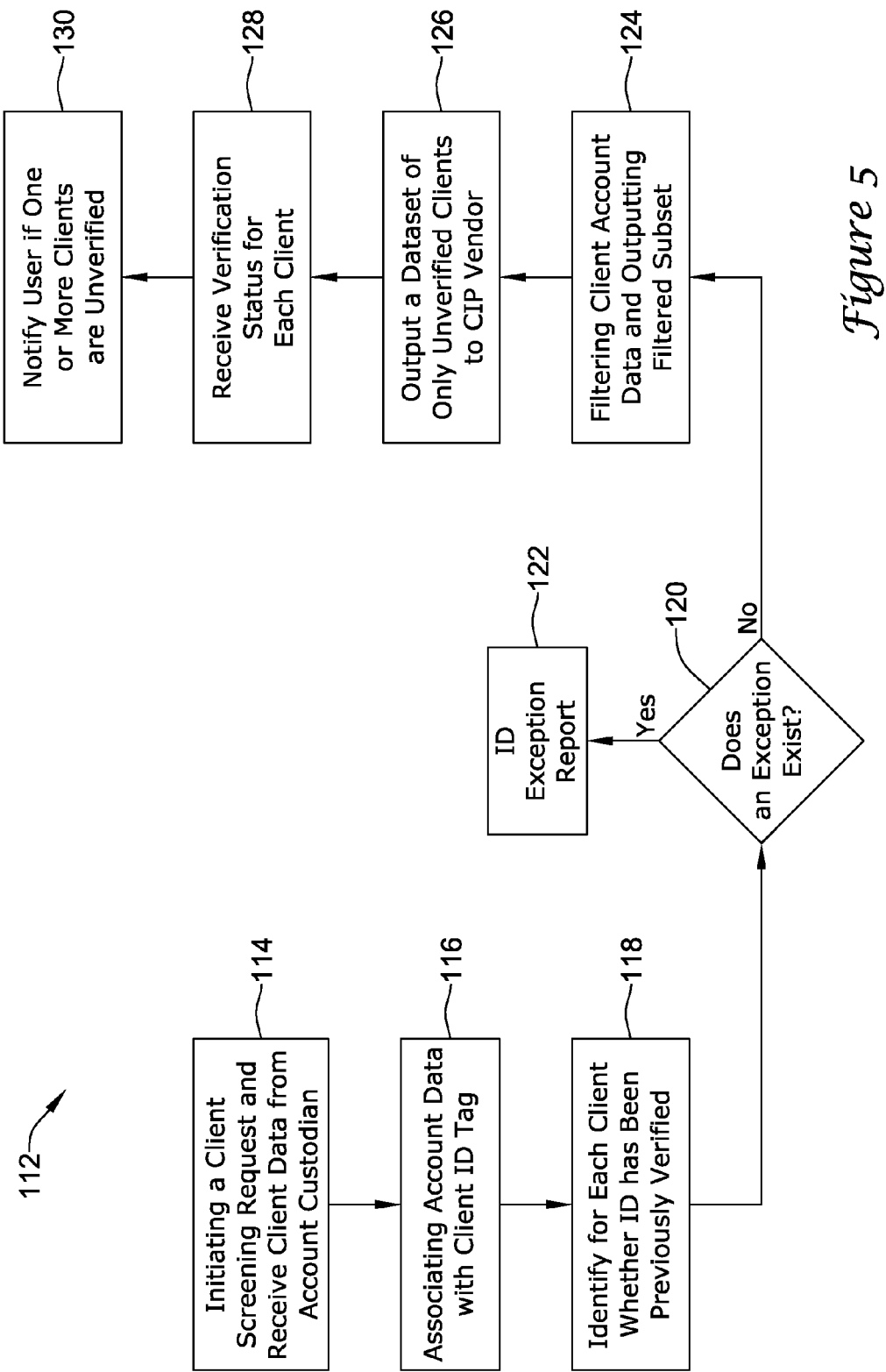
FIG. 5 is a flow chart of an illustrative method of screening clients for security compliance using the illustrative system of FIG. 3.

Referring now to FIG. 5, a flow chart of an illustrative method 112 of screening clients for security compliance with the system 64 of FIG. 3 will now be described. As shown in FIG. 5, method 112 may generally begin with the step 114 of initiating a client screening request and receiving client account data for one or more new or existing clients from an account custodian. Initiation of the client screening request can occur automatically, for example, when a new account is opened for a new or existing client, or when a name and/or address change is received for at least one client. In some cases, initiation of the client screening request may occur when a representative or supervisor of the broker-dealer requests verification of a client's identity.

Once a client screening request is received at block 114, the client screening engine may then associate the account data received from the account custodian with a unique client identification tag for each client, as indicated generally by block 116. The accounts held by the account custodian can be associated to each client via a client identification tag such as social security number (SSN), passport number, or other unique number. Multiple accounts held by a single client can be associated together with the client's identification tag. If, for example, the client screening request is initiated when the client opens a new account number, the new account number along with any existing accounts owned by the client can be associated together via the client identification tag. In some embodiments, the step 116 of associating client account data with a client identification tag can occur by comparing data received from the account custodian with account data already stored within the broker-dealer database.

Once the account data received from the account custodian is associated with each client, the client screening engine may next identify for each client whether the client's identity has been previously verified, as indicated generally by block 118. If at block 118 the client screening engine determines that a particular client's identity has been previously verified, the engine can be configured to exclude that client from a list of clients to be submitted for screening by the CIP vendor.

If the client screening engine determines that a particular client's identity has not be verified at block 118, the engine may next determine whether an exception exists to exclude the account from screening, as indicated generally by block 120. If, for example, a new account request from the account custodian is responsible for triggering the client screening request, the client screening engine can be configured to determine whether the account is of a type that requires client screening. In some embodiments, for example, the client screening engine can be configured to determine whether the account to be opened falls under ERISA where client screening under the USA Patriot Act is exempted. The client screening engine may further determine if the account falls under another applicable exception implemented under the Customer Identification Program (CIP). If the account to be opened falls within an exception, the client screening engine can output an identification exception report indicating that the account has been exempted from client screening, as indicated generally by box 122.

If the client's identity has not been previously verified at box 116 and the triggering even causing the client screening request does not fall within an exception, the client screening engine may next filter the client account data received from the account custodian and output a filtered subset of the client account data to the user for review, as indicated generally by block 124. Filtering of the client account data may occur, for example, based on whether the user's clients have been previously screened by the CIP vendor, whether the client is a new client, and/or whether the client screening process for the client has been suppressed or bypassed. Filtering can also occur based on the date in which the account was opened, the representative or supervisor responsible for overseeing that customer's account, or other filtering criteria, as desired.

For those clients that the client screening engine determines have not been previously screened and who do not fall within a screening exception, the engine may prompt the user to output a dataset of unverified clients to be screened to the CIP vendor, as indicated generally at box 126. Submission of the client names to be verified by the CIP vendor may occur, for example, by the user clicking a "Request Verification" icon on the graphical user interface. Client information sent by this request may include the customer's social security number (SSN), name, birth-date, and address. Other identifying information may also be sent to the CIP vendor, if necessary.

From the information received, the CIP vendor may then compare such information against one or more databases to verify the customer's identity. As indicated generally by block 128, the verification status for each submitted client within the dataset can then be returned back to the submission/receiving engine. Information returned from the CIP vendor can include an indication whether the verification was successful such as "pass", "fail", or "review". In some cases, additional information about the client or the reason why the verification search was unsuccessful can be delivered to the user. As indicated generally by block 130, the user can be notified if the identity of one or more of the clients was unverified or requires further action. In those instances where the individual or organization being screened appears on a list of terrorists or terrorist organizations, a suspicious activity report (SAR) can be displayed on the user's screen prompting the user to take further action, if necessary.

Figure 6:
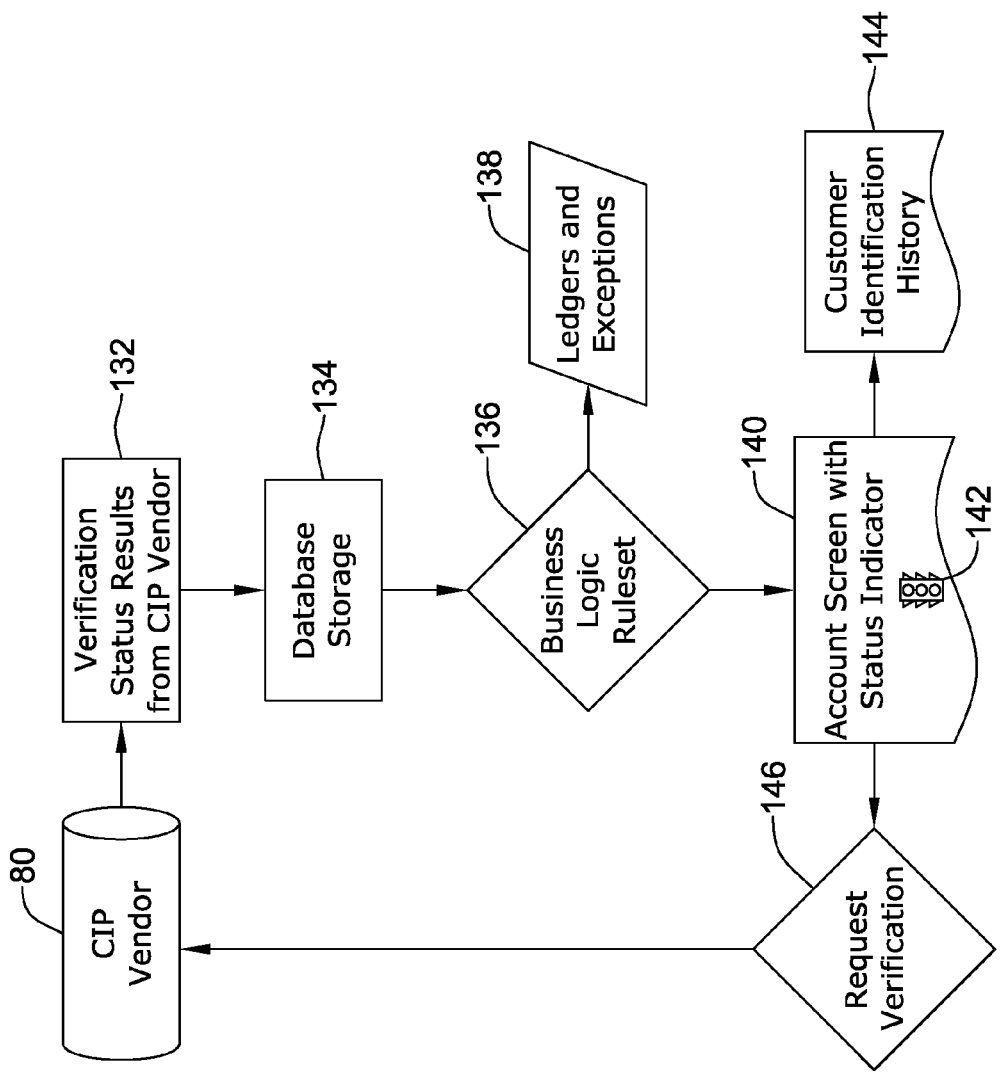
FIG. 6 is a flow chart showing an illustrative implementation of the method of FIG. 5.
Figure 7:
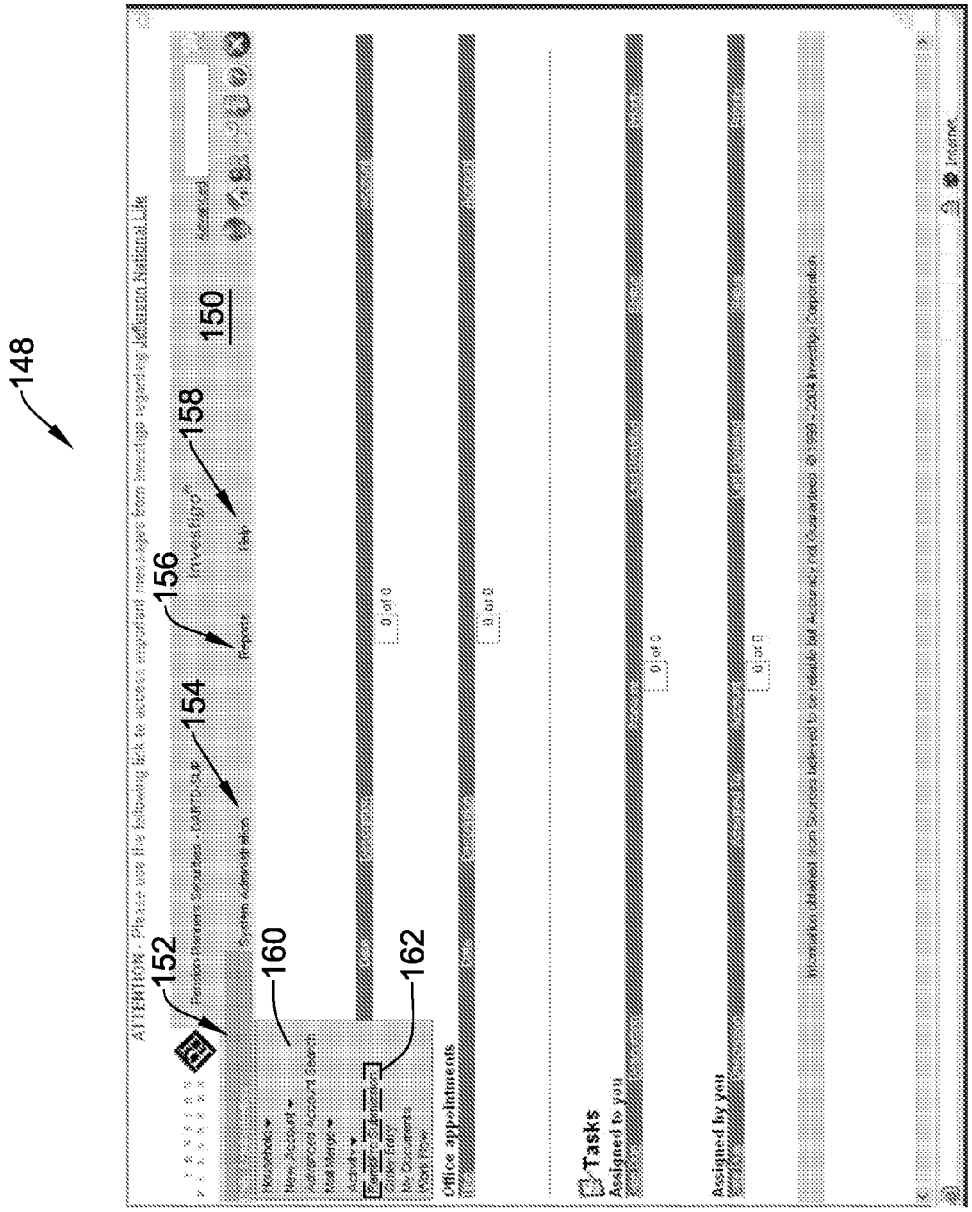
FIG. 7 is a screen shot of an illustrative menu-driven graphical user interface for use in screening clients.
Figure 11:
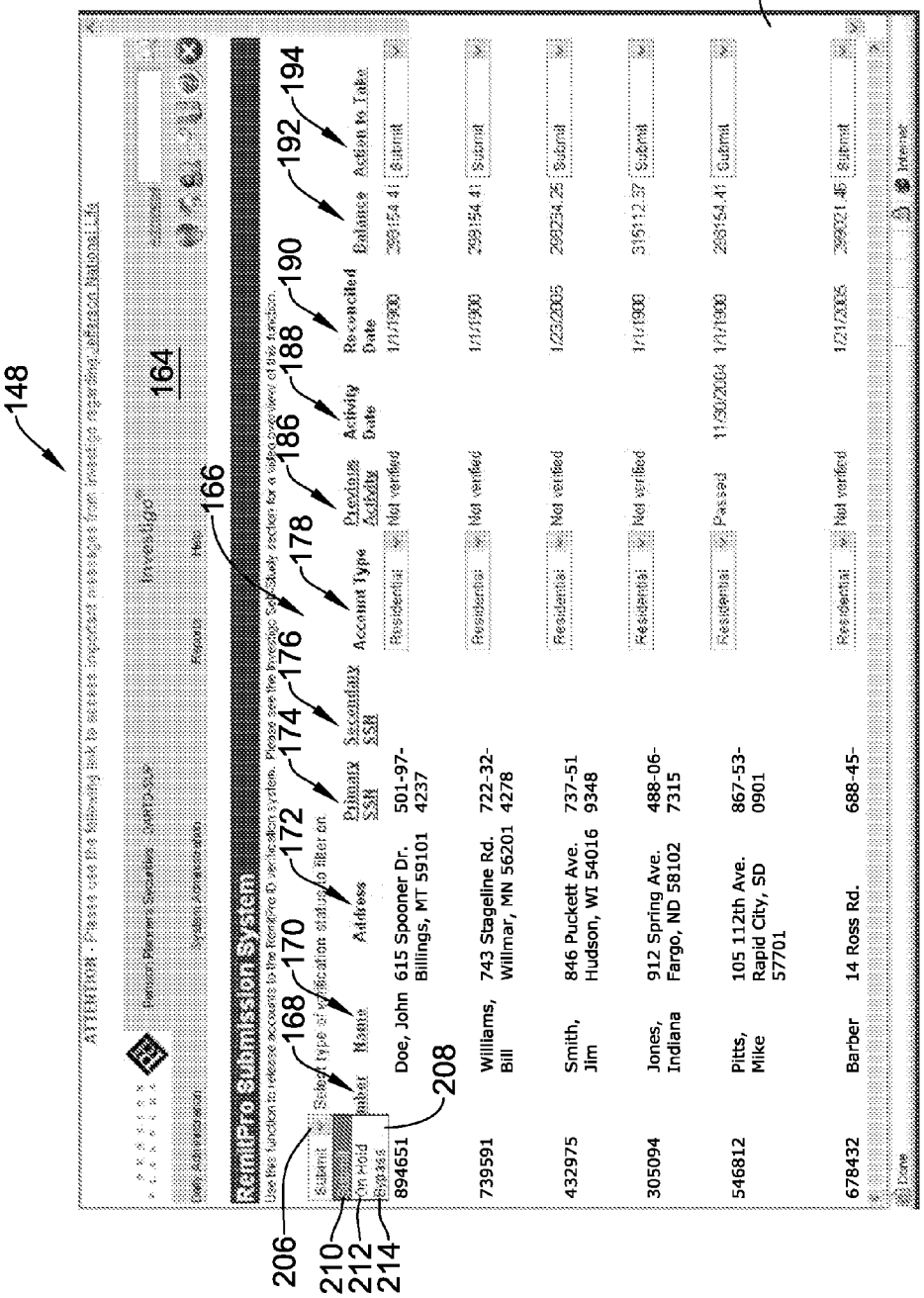
FIG. 11 is a screen shot showing the selection of a filtering field on the submission screen of FIG. 8.
Figure 16:
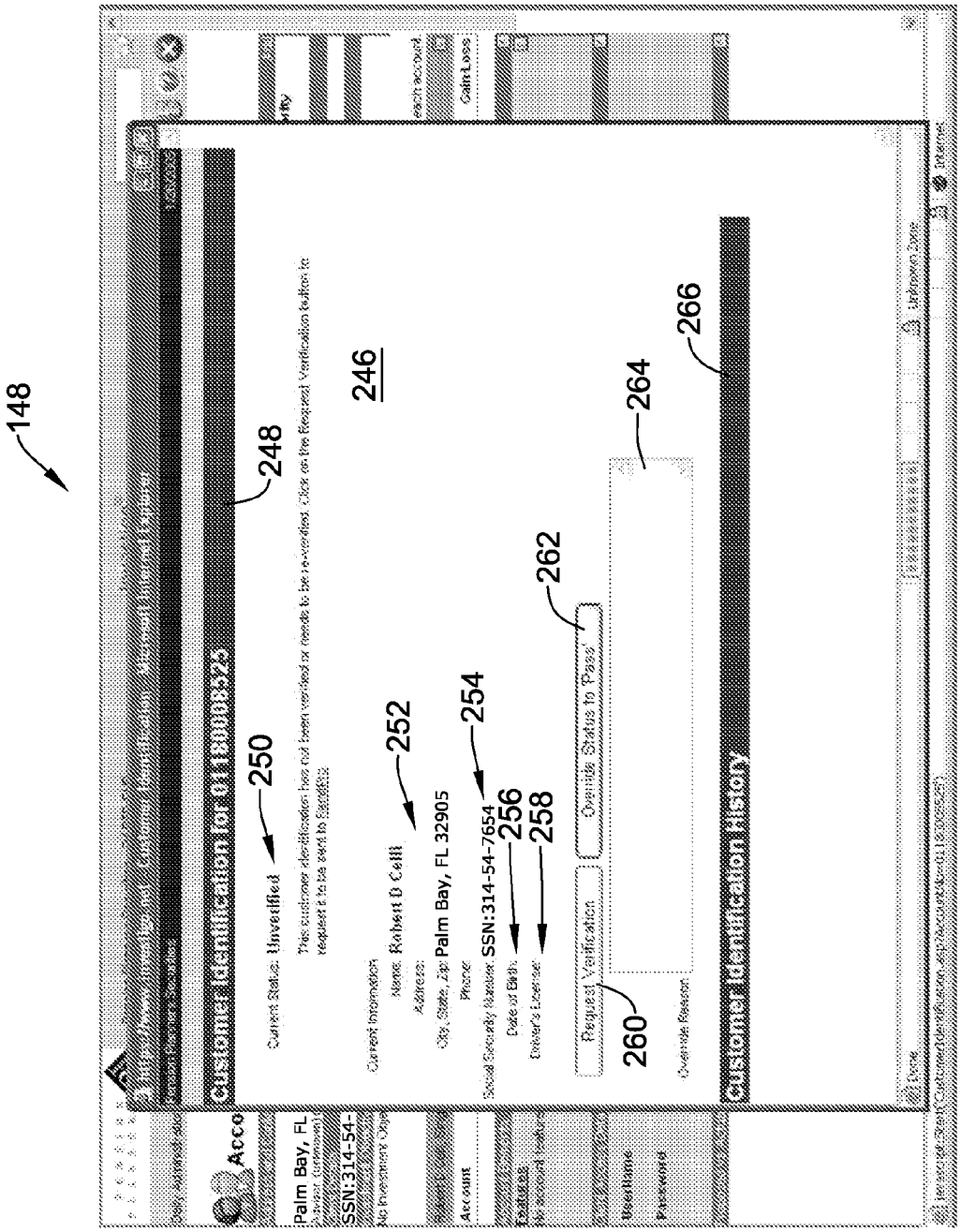
FIG. 16 is a screen shot showing an illustrative verification screen for requesting verification of a selected client.

FIG. 6 is a flow chart showing an illustrative implementation of the method of FIG. 5 once the verification results have been received back from the CIP vendor 80. As shown in FIG. 6, the verification status results 132 received from the CIP vendor 80 can be stored within the database, as indicated generally by box 134. Once the database is populated with the verification status results 132, the account data can be applied against business logic rule-set 136 containing those rules to be applied and interpreted by the client screening engine in filtering client account data. In some embodiments, for example, the business logic rule-set 136 can include those rules necessary to ensure compliance with the USA Patriot Act, including a list of account exceptions to be applied by the client screening engine to the dataset. As indicated generally by box 138, a log of ledgers and exceptions can be stored for each client account.

Once the verification status information 132 is applied against the business logic rule-set 136, an account screen including a verification status indicator can then be provided to the user via the display screen, as indicated generally by box 140. The account screen 140, for example, can be configured to display a stop light icon 142 with a green light indicating that the verification for the client was successful, a yellow light indicating that a problem occurred in the verification process and that further action is required, or a red light indicating that the verification was unsuccessful. If desired, a text message or other status indicator may also be display on the screen in addition to, or in lieu of, the stop sign icon 142.

From the account screen 140, the user may then access the client's identification history in order to view more specific information about the client's identification history, as indicated generally by box 144. From the account screen 140, the user may then chose to submit the client's information for verification, suppress or hold the submission of client data until a future date or time, or bypass the verification process altogether. If necessary, the user may also request verification of the client directly from the account screen 140, sending a request to the CIP vendor 80 to cross-check the client's identifying information against their databases.

Referring now to FIGS. 7-16, several screen shots of an illustrative menu-driven graphical user interface 148 for use in screening clients for security compliance under the USA Patriot Act will now be described. In an initial screen shot depicted in FIG. 7, the graphical user interface 148 can be configured to display a main menu screen 150 from which the various screens described in greater detail below can be accessed. The main menu screen 150 can include a "Daily Administration" pull-down menu 152 (shown highlighted), a "System Administration" pull-down menu 154, a "Reports" pull-down menu 156, and a "Help" pull-down menu 158. The Daily Administrative pull-down menu 152 may provide functionality for performing daily administrative tasks such as maintaining client contact information, setting up new customer accounts, performing searches on particular accounts, viewing E-mail, viewing customer activity, performing order entry activity, etc. The System Administration pull-down menu 154 may provide functionality for performing system administrative tasks such as network administration, maintenance of access keys for representatives and supervisors, etc. The Reports pull-down menu 156, in turn, may provide functionality for creating various reports, including reports pertaining to the verification status of selected clients, as described further with respect to FIGS. 13-16.

Selection of the Daily Administration pull-down menu 152 on the main menu screen 150 causes a selection box 160 to appear on the screen, providing the user with the ability to select among several administrative tasks to be performed. The selection of a "RemitPro Submission" section 162 within the selection box 160 causes the graphical user interface 148 to display a client verification submission screen 164, as further shown in a second screen shot depicted in FIG. 8. The submission screen 164 can be configured to display a worktable 166 containing various fields relating to one or more client accounts. The worktable 166 can include an account number section 168, a name section 170, an address section 172, a primary social security number (SSN) section 174, and a secondary social security number (SSN) section 176, as shown.

An account type section 178 of the worktable 166 can be configured to display the type of account corresponding with each client account. An icon selection bar 180 can be provided to permit the user to indicate the type of account to be associated with each account. As depicted in another illustrative screen shot in FIG. 9, for example, the icon selection bar 180 can permit the user to input whether the address for a particular account is either "residential" or "business" by selecting the appropriate text 182,184 on the screen. The ability to select the account type in this fashion allows the CIP vendor to more accurately cross-check the client identity information submitted against their databases.

Figure 8:
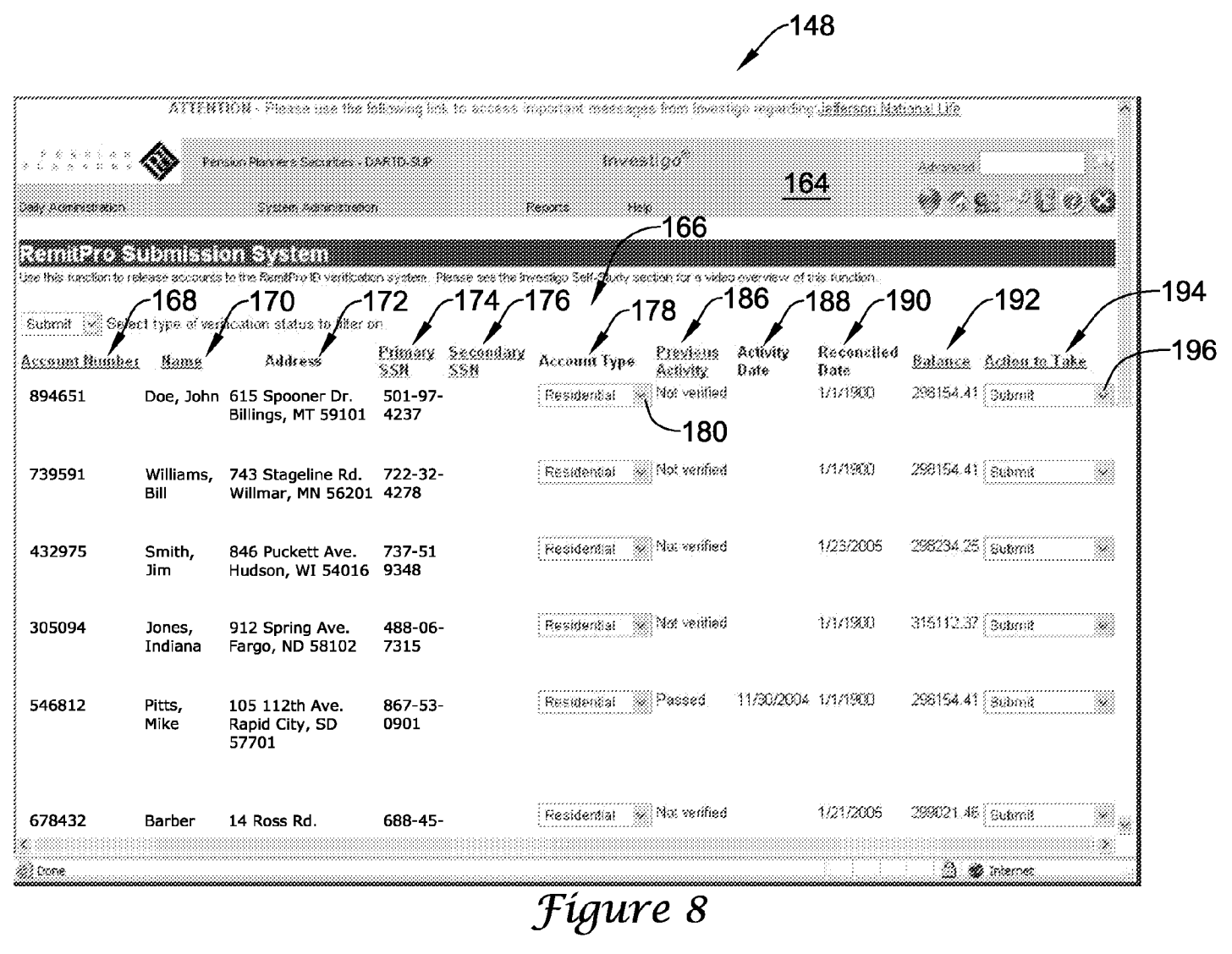

As can be further seen in FIG. 8, the worktable 166 can include a previous activity section 186, which can indicate whether the client's identity has been previously verified. With respect to account number "894651" displayed on the first line of the worktable 166, for example, the text "Not verified" is shown under the previous activity section 186, indicating that the client's identity for that account has not yet been verified. In contrast, with respect to account number "546812" displayed on the fifth line of the worktable 166, the text "Passed" is shown under the previous activity section 186, indicating that the client's identity for that account has already been verified. An activity date section 188 of the worktable 166 can be provided to display the date in which verification was successful.

In some cases, other account information may be displayed on the worktable 166. A reconciled date section 190, for example, can be provided to display the date in which the account was last reconciled. A balance section 192, in turn, can be provided to display the current balance of the account. To facilitate viewing, selection of each of the heading sections can cause the graphical user interface 148 to sort each line within the worktable 166 based on entries within that section, in either ascending or descending order. With respect to the primary social security number section 174, for example, selection of that section heading can cause all of the field entries within the worktable 166 to be arranged numerically in either ascending or descending order based on social security number.

An action-to-take section 194 of the submission screen 164 can be provided to permit the user to select a screening action to be preformed for each account entry within the worktable 166. An action icon selection bar 196 for each account entry can be displayed on the submission screen 164, providing the user with feedback on the current action to be taken for that account. As shown in another screen shot in FIG. 10, selection of each of the action icon selection bars 196 can cause a menu box 198 to be displayed on the screen, providing the user with one or more choices. In the illustrative embodiment of FIG. 10, for example, the action fields can include a "Submit" field 200, a "Bypass" field 202, and a "Hold" field 204. The "Submit" field 200 can be provided to permit the user to select the account for identity verification submission. The "Bypass" field 202, in turn, can be provided to permit the user to bypass the client verification process for that particular account. The "Hold" field 204 can be provided to permit the user to delay submission until a later point. For each account entry in which no client verification has been performed, the graphical user interface 148 can be configured to default to a particular field such as the "Submit" field 200.

A filtering selection bar 206 located on the submission screen 164 can be provided to permit the user to filter entries within the worktable 166 based on one or more filtering criteria. As shown in another screen shot in FIG. 11, selection of the filtering selection bar 206 can cause a menu box 208 to be displayed on the screen. The menu box 208 can include one or more fields to permit the user to display only certain entries within the worktable 166. In the illustrative embodiment depicted in FIG. 11, for example, the menu box 208 can include a "Submit" field 210, an "On Hold" field 212, and a "Bypass" field 214. Other filtering criteria may also be displayed within the menu box 208, if desired. When one of the fields 210,212,214 is selected by the user, the graphical user interface 148 can be configured to display only those entries within the worktable 166 that meet the selected filter criterion. If, for example, the user selects the "Submit" field 210 (shown highlighted), the graphical user interface 148 can be configured to display only those entries within the worktable 166 in which the "Submit" field 200 is selected under the action-to-take section 194.

The submission screen 164 can further include a number of icon buttons to permit the user to perform other functions on the worktable 166. As shown in another screen shot in FIG. 12, which represents a lower section of the submission screen 164 accessible via slide bar 216, the submission screen 164 can include a "Reset Selections" icon button 218 that can be used to reset each account within the worktable 166 back to their previous settings, and a "Reset Sort Order" icon button 220 that can be used to reset the sorting order of the worktable 166 back to its previous or default settings.

Once the user has selected each account entry in which client screening is desired, an "Update Accounts" icon button 222 provided on the submission screen 164 can be selected, causing the submission/receiving engine to submit customer identifying information to the CIP vendor information for each account in which the "Submit" field 200 is selected under the action-to-take section 194. The client screening engine can be configured to associate each account owned by a particular client to a unique client identification tag so that only one submission for verification is made when the client has multiple accounts.

If at any time the user desires to view a report of any customer accounts in which a customer identification exception was made, the user may select the Reports pull down menu 156 from either the main screen 150 or submission screen 164, causing the graphical user interface 148 to display the option to generate various reports relating to client screening as well as other functions. As shown in another screen shot in FIG. 13, for example, selection of the Reports pull-down menu 156 on the submission screen 164 can cause a menu box 224 to be displayed on the screen, providing the user with various selection fields for generating various reports.

Figure 14:
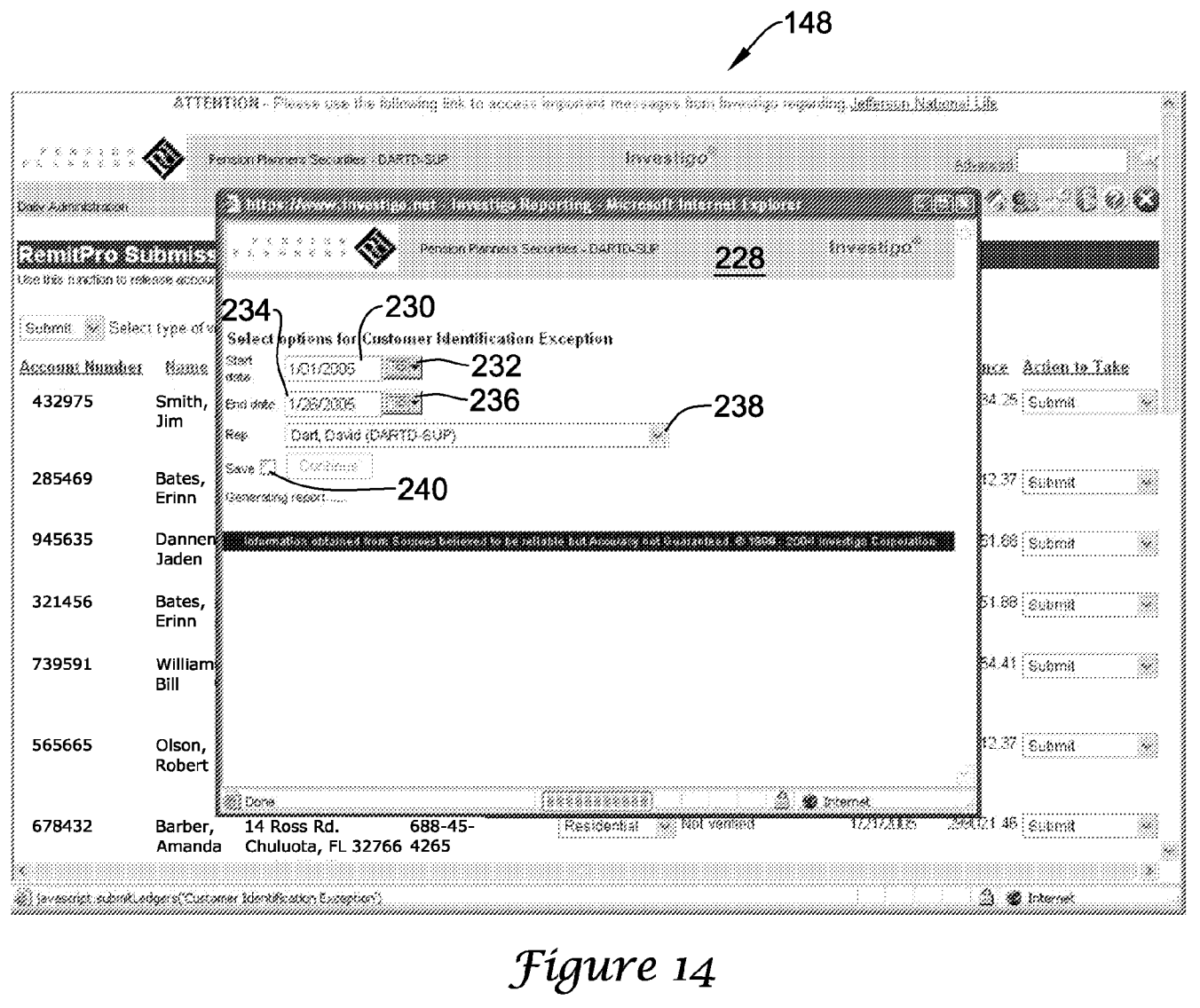

Selection of a "Customer Identification Exception" field 226 within the menu box 224 can cause the graphical user interface 148 to display a report screen 228, as shown in another screen shot in FIG. 14. The report screen 228 can include a date box 230 and calendar display icon 232 that can be used to select a start date in which to generate a report of those customers whose identity have not yet been verified. In similar fashion, a date box 234 and calendar display icon 236 can be provided to permit the user to select an end date of the report, if desired. Typically, the end date box 234 will default to display the current date, which can then be changed by the user to narrow the dates of the report, if desired. A representative selection icon bar 238 displayed on the report screen 228 can be provided to permit the user to limit the report to only those clients associated with a particular representative or supervisor, if desired. Once a report has been generated and displayed on the report screen 228, a save button icon 240 can be used to save the report for future reference, if desired.

Figure 15:
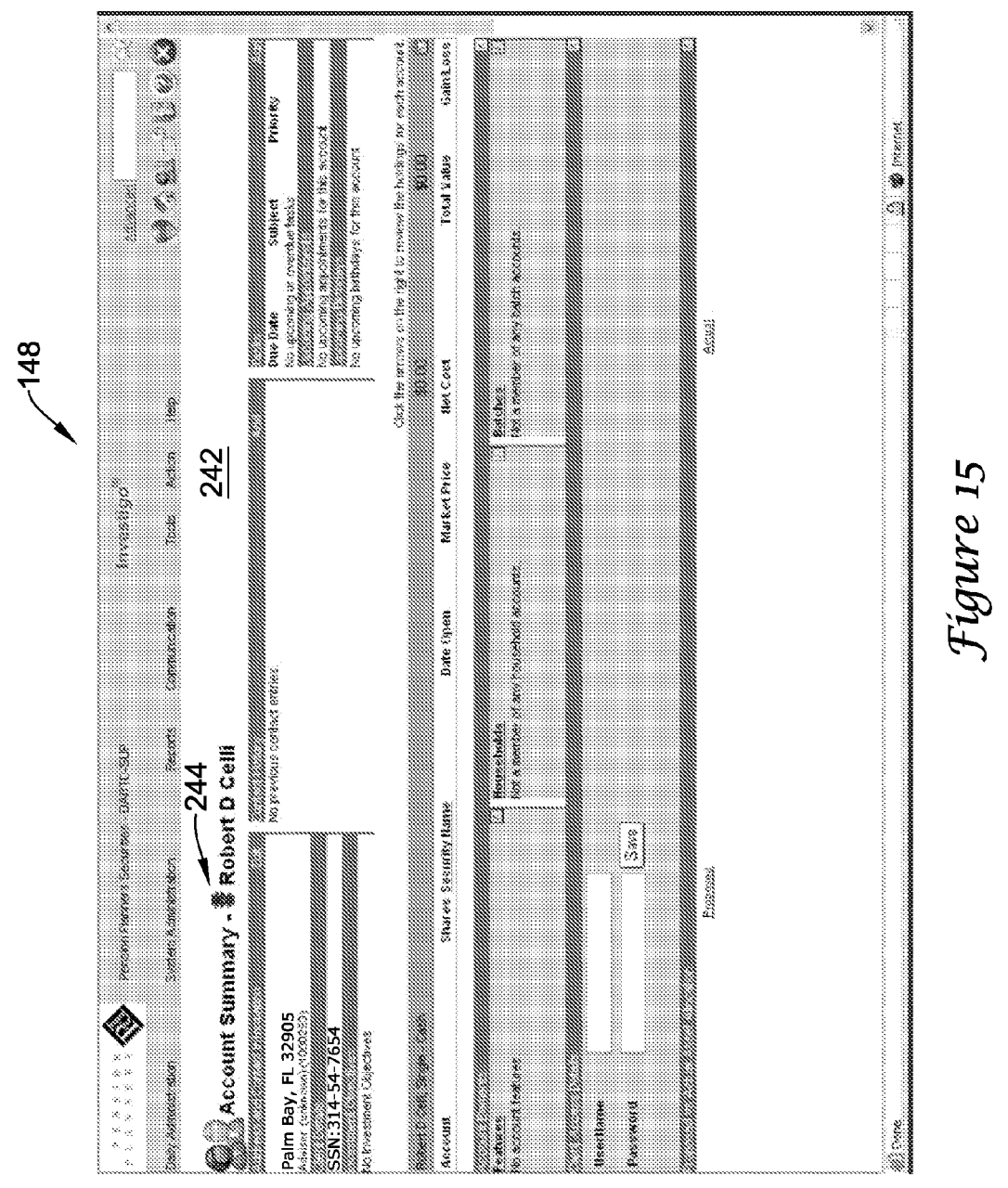

The selection of each client listed on the report screen 228 can cause an account summary screen 242 to be displayed on the screen, providing the user with more specific information about the client, as shown in another screen shot in FIG. 15. A verification status indicator 244 can be displayed on the account summary screen 242, providing the user with feedback on the verification status of that client. The verification status indicator 244 can comprise, for example, a stop light icon with a green light indicating that the verification for that client was successful, a yellow light indicating that a problem occurred in the verification process and that further action is required, or a red light indicating that the verification was unsuccessful. From the account summary screen 242, selection of the verification status indicator 244 can cause the graphical user interface 148 to display a customer verification screen 246, as shown in another screen shot depicted in FIG. 16. The verification screen 246 can be configured to display a "Customer Identification" section 248 including a verification status field 248; a name, address, and contact information field 252; a social security number field 254, a date of birth field 256, and a driver license number field 258. Other fields in addition to, or in lieu of, these fields can also be displayed on the verification screen 246, as desired.

A "Request Verification" icon button 260 provided on the verification screen 246 can be selected to immediately perform a verification request of the selected client. An "Override Status" icon button 262, in turn, can be provided to permit the user to override client screening for that selected client. If desired, a text box 264 provided on the verification screen 246 can be used to enter the reason or reasons for the override. A date/time stamp may also be provided to record the date and time in which the resubmission or override request is made.

A "Customer Identification History" section 266 of the verification screen 246 can be configured to display the history of any previous verification requests that may have been performed for the client. Information that can be displayed in this section can include, for example, the date and/or time that each verification request was made, the verification status of each request such as "pass", "fail", or "review", the client information relied upon by the CIP vendor involved in the identity verification, the name and contact information of the CIP vendor involved in the identity verification, the representative or supervisor responsible for making the verification request, etc. In some cases, additional information received from the CIP vendor regarding the verification search may be further displayed on the screen.

Figure 17:
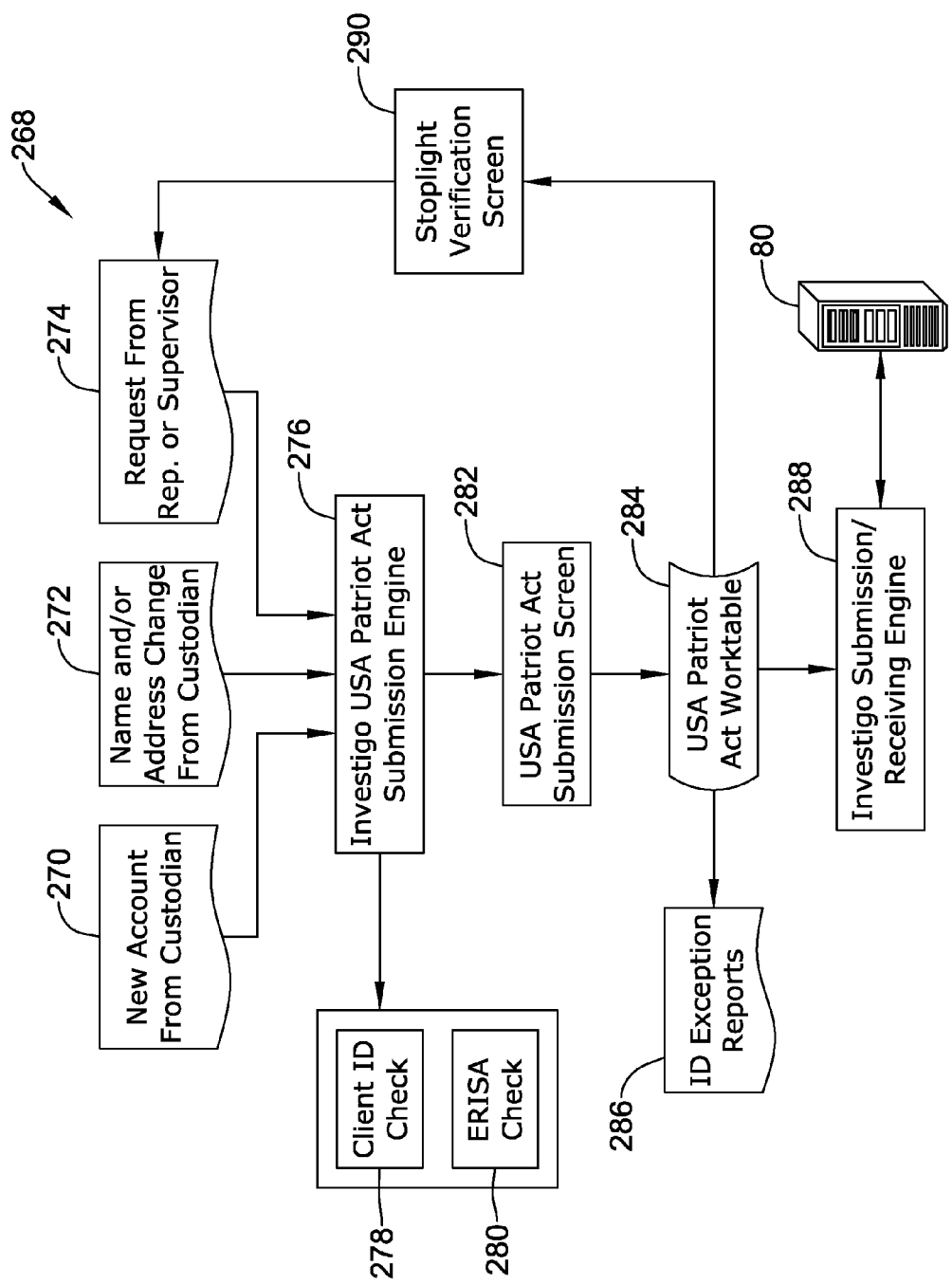
FIG. 17 is a flow chart showing an illustrative method of screening clients using the graphical user interface of FIGS. 7-16.

FIG. 17 is a flow chart showing an illustrative method 268 of screening clients using the illustrative graphical user interface 148 of FIGS. 7-16. As shown in FIG. 17, the method 268 may begin with the step of initiating a client screening request and receiving account data for one or more new or existing clients from an account custodian. Initiation of the screening request can occur automatically, for example, when a new account is opened, as indicated generally by block 270, or when a name and/or address change is received from the account custodian, as indicated generally by block 272. As further indicated by box 274, initiation of the client screening request may also occur when a representative or supervisor requests verification of a client's identity by selecting the "Update Accounts" icon button 222 on the submission screen 164 shown in FIG. 12, or the "Request Verification" icon button 260 on the verification screen 246 shown in FIG. 16.

Once a client screening request is received, the client screening engine 276 may then associate the account data received with a unique client identification tag 278 (e.g. Social Security number (SSN)) and determine if the client's identity has been previously verified. If the client screening engine 276 determines that a particular client's identity has not bee verified, the client screening engine 276 may then determine whether an exception exists to exclude the account from screening, as indicated generally by block 280. In those embodiments where the Customer Identification Program is targeted for compliance under the USA Patriot Act, for example, the client screening engine 276 can be configured to determine whether the account falls under an ERISA exception where screening is unnecessary.

As indicated by box 282, the submission screen 164 can be configured to display client account data to the user, which may then be filtered based on filtering criteria such as verification status (e.g. pass, fail, review), submission status (e.g. submit, hold, bypass), date, and/or representative or supervisor. As further indicated by box 282, the submission screen 164 can be configured to display the worktable 166 to the user. From this worktable 166, the user may then generate an ID exception report, as indicated generally by block 286. The client identifying information can then be submitted for verification by the CIP vendor 80, as indicated generally by block 288. The verification screen 246 can also be displayed, as indicated generally by block 290, providing the user with notification of the verification status of the client or clients submitted for verification.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A method, comprising:
specifically programming at least one computer system to perform at least the following:
receiving, by the at least one specifically programmed computer system, account data from a plurality of account custodians, wherein the account data comprises account information of a plurality accounts of a client and wherein account custodians are unrelated entities;
storing, by the at least one specifically programmed computer system, the account data in at least one database;
utilizing, by the at least one specifically programmed computer system, at least one unique client identification tag to associate with the client the plurality of accounts of the client in the account data received from the plurality of account custodians that are unrelated entities;
receiving automatically, by the at least one specifically programmed computer system, a client screening request for the client from at least one account custodian from the plurality of account custodians, wherein the client screening request is automatically received based, at least in part, on one of the following:
   i) when a new account is opened by the at least one account custodian, or
   ii) when a name and/or address change is received from the at least one account custodian, and
   iii) when a representative of the at least one account custodian requests verification of an identity of the client;
determining, by the at least one specifically programmed computer system, a verification status of the client whose identity needs to be verified based, at least in part, on the account data received from the plurality of the account custodians, wherein the determining is performed based, at least in part, on:
   i) at least one exception, wherein the at least one exception identifies a type of an account for which a governmental agency requires to verify an identity of an account holder,
   ii) the at least one unique client identification tag, wherein the at least one unique client identification tag is associated with information identifying whether the identity of the client has been previously verified by another account custodian of the plurality of account custodians, and
   iii) at least one verification request submitted to at least one customer identification program vendor to verify the identity of the client, wherein the at least one verification request comprises identifying information of the client; and
notifying, by the at least one specifically programmed computer system, in response to the received client screening request, the at least one account custodian of the determined verification status of the client so that the at least one account custodian does not submit a duplicate of the at least one verification request to the at least one customer identification program vendor.

2. The method of claim 1, wherein the receiving the client screening request is performed automatically each time a new account is opened for a new or an existing client.

3. The method of claim 1, wherein the receiving the client screening request is performed automatically when a name and/or address change is received for the client.

4. The method of claim 1, wherein the notifying the at least one account custodian of the verification status of the client in response to the received client screening request from the at least one account custodian comprises: generating, by the at least one specifically programmed computer system, a report on a display screen.

5. The method of claim 1, wherein the at least one account custodian is a financial institution.

6. The method of claim 5, wherein the financial institution is selected from the group consisting of: a bank, a broker, a dealer, a trust company, a currency exchange, an insurance company, a saving association, a credit union, a mutual fund company, a futures commission merchant, and a futures introducing broker.

7. A computer system, comprising:
a) a non-transient memory having at least one region for storing computer executable program code; and
b) at least one processor for executing the program code stored in the non-transient memory, wherein the program code comprises:
code to receive account data from a plurality of account custodians, wherein the account data comprises account information of a plurality at least one accounts of a client and wherein account custodians are unrelated entities;
code to store the account data in at least one database,
code to utilize at least one unique client identification tag to associate with the client the plurality of accounts of the client in the account data received from the plurality of account custodians that are distinct financial institutions;
code to receive automatically a client screening request for the client from at least one account custodian from the plurality of account custodians, wherein the client screening request is automatically received based, at least in part, on one of the following:
  i) when a new account is opened by the at least one account custodian, or
  ii) when a name and/or address change is received from the at least one account custodian, and
  iii) when a representative of the at least one account custodian requests verification of an identity of the client;
code to determine a verification status of the client whose identity needs to be verified based, at least in part, on the account data received from the plurality of the account custodians, wherein the determining is performed based, at least in part, on:
  i) at least one exception, wherein the at least one exception identifies a type of an account for which a governmental agency requires to verify an identity of an account holder,
  ii) the at least one unique client identification tag, wherein the at least one unique client identification tag is associated with information identifying whether the identity of the client has been previously verified by another account custodian of the plurality of account custodians, and
  iii) at least one verification request submitted to at least one customer identification program vendor to verify the identity of the client, wherein the at least one verification request comprises identifying information of the client; and
code to notify, in response to the received client screening request, the at least one account custodian of the determined verification status of the client so that the at least one account custodian does not submit a duplicate of the at least one verification request to the at least one customer identification program vendor.

8. The computer system of claim 7, wherein the code to receive the client screening request is automatically executed each time a new account is opened for a new or an existing client.

9. The computer system of claim 7, wherein the code to receive the client screening request is automatically executed when a name and/or address change is received for the client.

10. The computer system of claim 7, wherein the code to notify the at least one account custodian of the verification status of the client in response to the received client screening request from the at least one account custodian comprises:
code to generate a report on a display screen.

11. The computer system of claim 7, wherein the at least one account custodian is a financial institution.

12. The computer system of claim 11, wherein the financial institution is selected from the group consisting of: a bank, a broker, a dealer, a trust company, a currency exchange, an insurance company, a saving association, a credit union, a mutual fund company, a futures commission merchant, and a futures introducing broker.

* * * * *